Sept. 17, 1940.    W. ZUPANEC    2,215,310
SCALE AND POINTER INDICATOR
Filed March 23, 1939
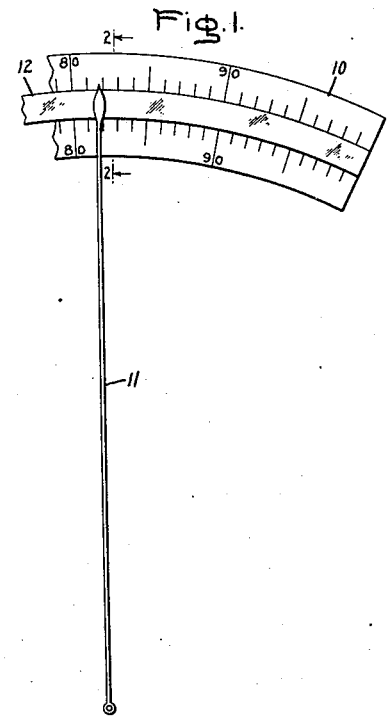
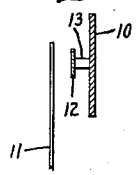
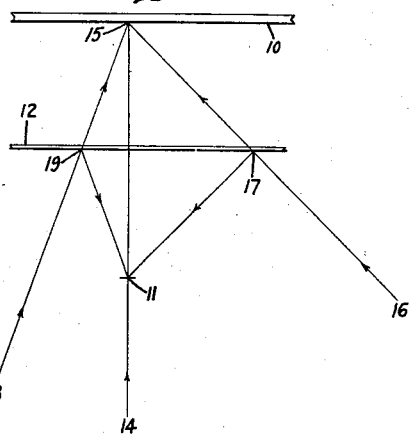
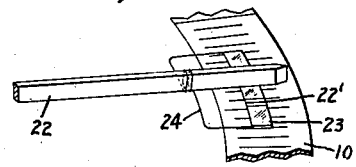
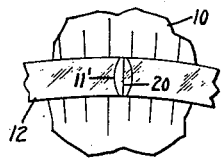
Inventor:
William Zupanec,
by Harry E. Dunham
His Attorney.

Patented Sept. 17, 1940

2,215,310

UNITED STATES PATENT OFFICE 2,215,310

SCALE AND POINTER INDICATOR

William Zupanec, Schenectady, N. Y., assignor to General Electric Company, a corporation of New York Application March 23, 1939, Serial No. 263,685

3 Claims. (Cl. 88—1)

My invention relates to indicating devices equipped with a scale and a pointer cooperating with the scale such as is employed in numerous measuring instruments and meters and its object is to increase the ease and accuracy of the reading of such instruments and in particular to avoid that type of reading error known as the parallax error. A further object of my invention is to provide an instrument scale and pointer arrangement that may be accurately read from any convenient observation angle.

In carrying my invention into effect in its preferred form, I provide a mirror midway between the pointer and scale in the path of vision so that in case the reading is made from an angle, other than perpendicular, the reflection of the pointer in the mirror will appear to line up with the actual position of the pointer perpendicular to the scale.

The features of my invention which are believed to be novel and patentable will be pointed out in the claims appended hereto. For a better understanding of my invention reference is made in the following description to the accompanying drawing in which Fig. 1 represents a face view of a scale and pointer arrangement embodying my invention; Fig. 2 represents a side sectional view through the scale and mirror adjacent the pointer; Fig. 3 represents an enlarged view edgewise of the scale and mirror in the line of the pointer illustrating the reflection reading principle for various observation angles; Fig. 4 represents what is seen in the mirror when a reading is taken at an angle; and Fig. 5 shows a mirror carried by the pointer.

In Fig. 1, I have shown the face or front view of an ordinary scale plate 10 provided with graduations as shown and a pointer 11 in front of and cooperating with the scale. In the operation of the instrument on which the scale and pointer are used the pointer swings over the scale and is some distance above the scale as represented in the sectional side view, Fig. 2. With the conventional arrangement as thus far described, a person desiring to accurately read the measurement position of the pointer with respect to the scale must be careful to view the pointer and scale from a point in a plane perpendicular to the scale and in line with the pointer.

If, now, it be assumed that the same pointer position be read but with the observer in an inaccurate reading position, say to the right of the correct reading position, the pointer will appear to be down scale from the position represented and the reading will be low. In the same way, if the observer is to the left of a correct reading position, the reading will be too high. This gives rise to what is termed parallax and errors due to parallax. It is the apparent different positions of the pointer with respect to the scale when observed from different points. It has heretofore been proposed to provide a mirror back of or in the plane of the scale for reflecting a portion of the pointer to assist the instrument reader in placing his eye in the correct reading position where there is no error due to parallax. This is accomplished when the pointer and its image are in line with the eye. This expedient, however, does not permit of correctly reading the instrument pointer position from any angle. It merely indicates the one position from which the instrument may be read correctly.

According to my invention the instrument may be correctly read from any position where the scale and pointer are clearly visible. For this purpose I provide a mirror 12 midway between the pointer 11 and scale 10 and running the length of the scale. This mirror may be placed adjacent the lower edge of the scale or, as represented, adjacent the middle of the scale. In any case the mirror is so placed along the scale that the reflection of the pointer therein may be compared to the scale graduations. The mirror may be a strip of polished metal and supported in proper position with respect to the scale plate and pointer by securing it to the mid-section of the scale plate by supporting structure indicated at 13 in Fig. 2 so that the scale graduations extend out from either edge thereof as shown in Fig. 1.

By placing such a mirror midway between the scale and pointer the reflection of the pointer in the mirror, if it can be seen at all, will be in line with the scale graduation directly beneath the pointer and this reflected image of the pointer will give a correct reading on the scale from all angles. The reason for this is illustrated in Fig. 3. If a person observes the pointer and scale from the position of no parallax error, that is with his eye in a plane perpendicular to the scale plate and in line with the pointer along line 14—11—15, for example in Fig. 3, the correct reading will be obtained and the reflection of the pointer 11 in mirror 12 will not be seen. This is the same procedure as for correctly reading instruments of the prior art, and mirror 12 can be used to aid the observer in thus positioning himself, if he so desires. For example, he merely places his eye in line with the pointer and its reflected image when reading the instrument.

However, this is now no longer necessary. Let us suppose, for example, that the observer views the scale along the line 16—15, pointer 11 remaining in the same position directly above scale point 15. Since the mirror 12 is half-way between pointer 11 and scale plate 10, the observer sees the reflected image of pointer 11 at point 17 of the mirror in line 16—15. Actually the reflected image appears to be at point 15. In other words the reflected image of the pointer appears to be at the correct reading point 15 of scale 10, and the instrument is correctly read by noting the position of the reflected image of the pointer on the scale. If the observer be at a different angle, for example looking along line 18—15, the reflected image of the pointer appears at 19 in line 18—15 and again a correct reading is obtained by observing the position of the reflection of pointer 11 on scale 10. Thus correct readings may be taken from any convenient angle and two or three persons may simultaneously read the instrument from different angles and all read it correctly.

It is assumed, of course, that a person who thus reads the instrument from an angle understands that he must look at the reflected image of the pointer in mirror 12 instead of looking at the pointer itself. This is not difficult since the reflection of only a part of the pointer appears in the mirror at only the proper position and if the pointer is of substantial width, I may provide a reference reading line on its back surface.

The pointer side nearest the observer possibly may also be reflected in the mirror but by making the pointer thin at this point or by making the side and rear surfaces of contrasting appearance, as by making the sides black or dull and the rear white or polished, no difficulty is experienced in clear visibility of the reflected image of the rear surface of the pointer. Thus in Fig. 4, 11' may represent the reflected image of the pointer as seen in mirror 12 against scale plate 10, the line 20 representing the reflected image of a reading reference line drawn through the center of the rear surface of the pointer.

The important precaution to be observed in utilizing this invention is to have the mirror surface equally distant from the front surface of the scale plate and the rear surface of the pointer for all pointer positions along the scale. A thin strip of metal mirror may be readily added to most existing instruments for the purpose of utilizing this invention. If supported by the scale plate, it should run the length of the scale. The mirror may, however, be carried by the pointer, in which case a relatively short, light-weight mirror may be used as shown at 23 in Fig. 5. In such cases the mirror supporting clip 24 should be suitably spaced from the observation area closely about the pointer end. In Fig. 5 the reflected image of the pointer 22 is indicated at 22'.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination, a graduated scale, a pointer movable over said scale and indicating thereon, said pointer being spaced from said scale, and mirror means for producing an image of the rear side of said pointer appearing in the plane of the scale at a point on said scale directly opposite said pointer when such scale point is observed from a point to one side of said pointer, said mirror means being supported parallel with the scale and half-way between it and the pointer and being so dimensioned that the scale graduations are visible along the edge thereof.

2. In combination, a graduated scale plate having a pointer movable over said scale for indicating thereon, said pointer being spaced from said scale, and a mirror narrower than the scale and extending from end to end of said scale and supported from said scale plate in a plane equally distant from the scale and pointer for the purpose of producing an image of said pointer in correct reading position on said scale when readings are taken from positions other than from in a plane perpendicular to said scale and in line with said pointer.

3. In combination, a graduated scale, an indicator spaced from said scale and movable over said scale in a path parallel to said scale, and a mirror narrower than the scale so that the scale graduations extend out from the edge of the mirror, said mirror being carried by said indicator in a plane parallel to said scale and midway between said scale and pointer for the purpose of reflecting a scale reading image of said pointer.

WILLIAM ZUPANEC.